US008944916B2

(12) United States Patent
Abouchar et al.

(10) Patent No.: US 8,944,916 B2
(45) Date of Patent: Feb. 3, 2015

(54) USES OF LOCATION TRACKING IN MOBILE DEVICES

(75) Inventors: Thomas S. Abouchar, Atlanta, GA (US); Martin J. Biernat, Downers Grove, IL (US); Andrew C. Guinn, Chicago, IL (US); Damon E. Gura, Chicago, IL (US); Mahesh Lakshmanaperumal, Des-Plaines, IL (US); Richard B. Robbins, Glenview, IL (US)

(73) Assignee: WMS Gaming, Inc., Waukegan, IL (US)

(*) Notice: Subject to any disclaimer, the term of this patent is extended or adjusted under 35 U.S.C. 154(b) by 424 days.

(21) Appl. No.: 13/185,932

(22) Filed: Jul. 19, 2011

(65) Prior Publication Data

US 2012/0015735 A1 Jan. 19, 2012

Related U.S. Application Data

(60) Provisional application No. 61/365,633, filed on Jul. 19, 2010.

(51) Int. Cl.
*A63F 13/00* (2014.01)
*G07F 17/32* (2006.01)

(52) U.S. Cl.
CPC ........ *G07F 17/3225* (2013.01); *G07F 17/3227* (2013.01); *G07F 17/3218* (2013.01); *G07F 17/3237* (2013.01); *G07F 17/3239* (2013.01)
USPC ........ 463/41; 463/42

(58) Field of Classification Search
CPC ........ G07F 17/3225; G07F 17/3227; G07F 17/3218; G07F 17/3237; G07F 17/3239
USPC ........ 463/41, 42
See application file for complete search history.

(56) References Cited

U.S. PATENT DOCUMENTS

| | | | | |
|---|---|---|---|---|
| 6,846,238 | B2 * | 1/2005 | Wells | 463/39 |
| 7,883,417 | B2 * | 2/2011 | Bruzzese et al. | 463/39 |
| 8,523,682 | B2 * | 9/2013 | Bickley | 463/42 |
| 8,602,882 | B2 * | 12/2013 | Nguyen et al. | 463/27 |
| 8,747,219 | B2 * | 6/2014 | Wright et al. | 463/25 |
| 8,758,120 | B2 * | 6/2014 | Wright et al. | 463/25 |
| 8,777,732 | B2 * | 7/2014 | Robbins et al. | 463/25 |
| 2003/0064805 | A1 * | 4/2003 | Wells | 463/39 |
| 2003/0148812 | A1 * | 8/2003 | Paulsen et al. | 463/42 |

(Continued)

OTHER PUBLICATIONS

"Bluetooth Setup Tutorial | Apple iPhone 3G | The Human Manual," The Human Manual, YouTube video/screen shots, posted Jul. 21, 2009, accessed Oct. 17, 2013, <http://www.youtube.com/watch?v=9MqlzKnApLs>.*

*Primary Examiner* — William H McCulloch, Jr.
(74) *Attorney, Agent, or Firm* — DeLizio Gilliam, PLLC

(57) ABSTRACT

In some embodiments, a computer-implemented method includes: detecting a plurality of wagering game machines in proximity to the mobile phone, and selecting a first of the plurality of wagering game machines with which to establish a connection. The method can also include requesting the connection with the first of the plurality of wagering game machines, and transmitting, from the mobile phone to the first of the plurality of wagering game machines, player account information for configuring a wagering game. The method can also include receiving, from the first of the plurality of wagering game machines, content indicating a result of the wagering game, and presenting, on the mobile phone, the result of the wagering game.

8 Claims, 10 Drawing Sheets

(56) References Cited

U.S. PATENT DOCUMENTS

| | | | | |
|---|---|---|---|---|
| 2003/0224852 | A1* | 12/2003 | Walker et al. | 463/20 |
| 2004/0085293 | A1* | 5/2004 | Soper et al. | 345/156 |
| 2004/0137987 | A1* | 7/2004 | Nguyen et al. | 463/42 |
| 2004/0209690 | A1* | 10/2004 | Bruzzese et al. | 463/39 |
| 2005/0054438 | A1* | 3/2005 | Rothschild et al. | 463/29 |
| 2005/0059485 | A1* | 3/2005 | Paulsen et al. | 463/29 |
| 2005/0130728 | A1* | 6/2005 | Nguyen et al. | 463/16 |
| 2006/0035707 | A1 | 2/2006 | Nguyen et al. | |
| 2006/0189382 | A1* | 8/2006 | Muir et al. | 463/29 |
| 2008/0058065 | A1* | 3/2008 | Okada | 463/20 |
| 2008/0261682 | A1* | 10/2008 | Phillips et al. | 463/25 |
| 2008/0318655 | A1* | 12/2008 | Davies | 463/16 |
| 2009/0197684 | A1 | 8/2009 | Arezina et al. | |
| 2009/0264190 | A1* | 10/2009 | Davis et al. | 463/26 |
| 2009/0265105 | A1* | 10/2009 | Davis et al. | 701/300 |
| 2010/0016052 | A1* | 1/2010 | Gagner et al. | 463/16 |
| 2010/0062840 | A1* | 3/2010 | Herrmann | 463/25 |
| 2010/0113161 | A1* | 5/2010 | Walker et al. | 463/42 |
| 2010/0255912 | A1* | 10/2010 | Ward | 463/36 |
| 2010/0323785 | A1* | 12/2010 | Motyl et al. | 463/25 |
| 2011/0130197 | A1* | 6/2011 | Bytnar et al. | 463/25 |
| 2011/0159940 | A1* | 6/2011 | Acres | 463/11 |
| 2011/0159948 | A1* | 6/2011 | Anderson et al. | 463/25 |
| 2011/0183732 | A1* | 7/2011 | Block et al. | 463/1 |
| 2011/0183749 | A1* | 7/2011 | Allen et al. | 463/25 |
| 2011/0306400 | A1* | 12/2011 | Nguyen | 463/20 |
| 2012/0015735 | A1* | 1/2012 | Abouchar et al. | 463/42 |
| 2012/0028714 | A1* | 2/2012 | Gagner et al. | 463/42 |
| 2012/0289313 | A1* | 11/2012 | Anderson et al. | 463/25 |
| 2012/0295696 | A1* | 11/2012 | Anderson et al. | 463/25 |
| 2012/0295697 | A1* | 11/2012 | Anderson et al. | 463/25 |
| 2012/0302326 | A1* | 11/2012 | Anderson et al. | 463/25 |
| 2014/0141864 | A1* | 5/2014 | Ward et al. | 463/25 |

* cited by examiner

USES OF LOCATION TRACKING IN MOBILE DEVICES

RELATED APPLICATIONS

This application claims the priority benefit of U.S. Provisional Application Ser. No. 61/365,633 filed Jul. 19, 2010.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2011, WMS Gaming, Inc.

FIELD

Embodiments of the inventive subject matter relate generally to wagering game systems, and more particularly to wagering game systems including mobile phone applications.

BACKGROUND

Wagering game machines (WGMs), such as slot machines, video poker machines and the like, have been a cornerstone of the gaming industry for several years. Generally, the popularity of such WGMs depends on the likelihood (or perceived likelihood) of winning money at the WGM and the intrinsic entertainment value of the WGM relative to other available gaming options. Where the available gaming options include a number of competing WGMs and the expectation of winning at each WGM is roughly the same (or believed to be the same), players are likely to be attracted to the most entertaining and exciting machines. Shrewd operators consequently strive to employ the most entertaining and exciting WGMs, features, and enhancements available because such machines attract frequent play and hence increase profitability to the operator.

BRIEF DESCRIPTION OF THE FIGURES

Embodiments of the invention are illustrated in the Figures of the accompanying drawings in which.

DESCRIPTION OF THE EMBODIMENTS

This description of the embodiments is divided into four sections. The first section provides an introduction to embodiments of the invention, while the second section describes example mobile phone architectures and wagering game networks. The third section describes example operations performed by some embodiments. The fourth section presents some general comments.

Introduction

This section provides an introduction to some embodiments of the invention. According to some embodiments of the inventive subject matter, casinos (and other wagering establishments) can leverage mobile phones to provide a richer wagering experience inside the casinos, and extend the wagering experience outside the casinos. Inside casinos, some embodiments allow players to automatically log into WGMs using mobile phones. Some embodiments also allow players to configure mobile phones to operate as auxiliary input devices for WGMs. Thus, players can use their mobile phones to provide input for placing wagers, spinning reels, selecting cards, etc. Some embodiments use mobile phone location tracking technologies to 1) locate players and direct them to points of interest in casinos (e.g., particular WGMs), 2) enable celebration events (e.g., light shows) to follow players as the players move around the casino, 3) provide social networking status updates related player location/movements.

As players leave casinos, some embodiments use mobile phones to track player movements outside casinos. By tracking player movements outside casinos, the casinos can offer promotions that draw players back into the casinos. Some embodiments enhance player experiences in other ways. For example, some embodiments enable players to download mobile versions of wagering games to the players' mobile phones. The mobile wagering games allow players to participate in monetary wagering when players are in jurisdictions that allow wagering. If the players are in jurisdictions where wagering is not allowed, the mobile phones can activate non-wagering (or "casual") versions of the wagering games. By playing wagering and non-wagering games on mobile phones, players can unlock exclusive content (e.g., new game episodes), earn trophies and rewards, etc. In some instances, after content is unlocked by game play on mobile phones, players can access the content by playing inside casinos (e.g., on WGMs).

Using Mobile Phones

FIGS. 1-4 reveal more details about some of the embodiments noted above.

Remote Login

Figure 1:
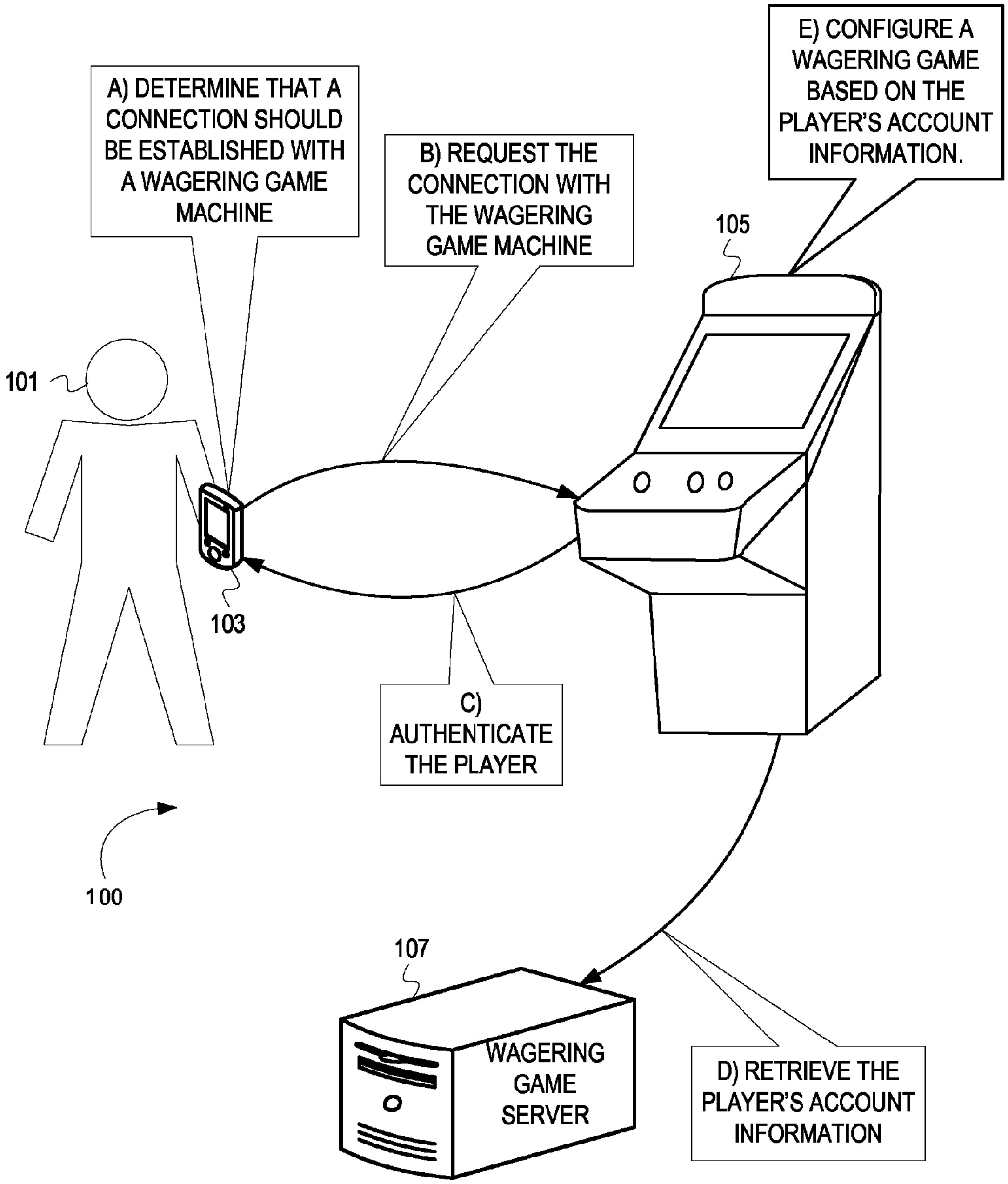
FIG. 1 is an example conceptual diagram of a system and operations for using a mobile phone to automatically log into a wagering game machine.

FIG. 1 is an example conceptual diagram of a system and operations for using a mobile phone to automatically log into a wagering game machine. In FIG. 1, a wagering game system 100 includes a wagering game server 107, WGM 105, and mobile phone 103. The wagering game server 107 can host wagering games presented on the WGM 105. In some embodiments, the wagering game server 107 also hosts wagering game accounts ("accounts"), which can facilitate financial transactions (e.g., debit wagers from the accounts), track player statistics (e.g., amounts wagered, win/loss percentages, time spent in wagering sessions, types of games played, etc.), provide promotional offers, and more. The mobile phone 103 can include a processor and software for performing the operations described herein. The software can be a special-purpose application program received from the wagering game system, a general purpose application (e.g., an Internet browser), or any other suitable software. As noted above, the system 100 enables players to access their accounts using mobile phones. In FIG. 1, operations for accessing accounts occur in stages A-E.

At stage A, the mobile phone 103 determines that a connection should be established with the WGM 105. In some instances, a player 101 prompts the mobile phone 103 to connect to a WGM. In other instances, the mobile phone 103 detects WGMs without player input. If the mobile phone 103 determines it is in proximity to the WGM 105 (e.g., by detecting wireless signals such as Bluetooth® signals, radio frequency identification (RFID) signals, etc.), the mobile phone 103 will attempt to establish a connection to the WGM 105. In some cases, more than one WGM may be in proximity to the mobile phone 103, so the mobile phone 103 can select one of many WGMs with which to connect. According to some embodiments, the mobile phone 103 selects a WGM based on input from a player 101. For example, the mobile phone 103 may receive a plurality of WGM identifiers from WGMs that are in range. The mobile phone 103 can then utilize a client application to display the identifiers in a graphical user interface. In turn, the player 101 can select a WGM based on the identifiers displayed in the graphical user interface. As another example, the mobile phone 103 can utilize the client application to download and display a map of WGMs near the player's location. The player 101 can choose one of the WGMs from the map. In some instances, instead of allowing a player to select a WGM, the mobile phone 103 itself selects a WGM with which to connect. Some embodiments offer another way by which the mobile phone 103 determines that it should connect to a WGM. The WGM 105 can display an image in which its WGM identifier is encoded. The player's mobile phone can photograph the image, and the phone's client application can decode the image to determine the WGM's identifier. After the mobile phone 103 has determined that it should connect to a WGM, it continues with the operations of stage B.

At stage B, the mobile phone 103 requests a connection with the WGM 105. In some instances, the mobile phone 103 requests the connection based on an identifier associated with the WGM 105. For example, the mobile phone 103 uses an identifier provided by the player 101 to request a wireless connection (e.g., via Bluetooth) with the WGM 105. In response, the WGM 105 accepts the request, and the WGM 105 and mobile phone 103 establish a wireless connection.

At stage C, the WGM 105 advances the player log-in process by authenticating the player. In some embodiments, the WGM 105 queries the mobile phone 103 for player authentication information. The player 101 may enter log-in information into the mobile phone 103, which forwards the log-in information to the WGM 105. Player authentication information can include usernames, passwords, personal identification numbers, account numbers, player email addresses, phone numbers, etc. The WGM 105 can forward the player authentication information to the wagering game server 107. In some embodiments, the mobile phone 103 automatically provides the player authentication information in the connection request.

At stage D, the WGM 105 requests and receives the player's 101 account information from the wagering game server 107. In some instances, the wagering game server 107 uses the player identifier to locate a database record including the player's account information. The server 107 may also mark the player's account as active, and return the account information to the WGM 105. The player's account information can include information identifying the player 101 (e.g., name, address, etc.), awards, trophies, persistent game state information, financial information, customizations for the gaming experience, etc.

At stage E, the WGM 105 configures a wagering game based on the player's account information. For example, the WGM 105 can configure buttons on its touch screen according to preferences indicated in the account information. As another example, the WGM 105 can present the player's avatar, and customize display colors and/or music based on the preferences. As another example, the WGM 105 can determine, based on the account information, that the mobile phone 103 has been configured as an auxiliary input device for the WGM 105. In response, the WGM 105 can configure a wagering game to accept input from the mobile phone 103. As yet another example, the WGM 105 can determine, based on persistent state information indicated in the player's account information, the player's progress in an episodic wagering game. Using the persistent state information, the WGM 105 can start the episodic wagering game at the same level at which the player 101 ended a previous wagering session.

Although FIG. 1 depicts the WGM 105 retrieving the player's 101 account information from the wagering game server 107, other embodiments operate differently. The WGM 105 can retrieve the player's 101 account information from the mobile phone 103, a web server that provides an interface for accessing the account outside casinos, or any other suitable component. Some account information can be stored on the wagering game server 107, while other account information can be stored on the mobile phone 103 and/or other components. For example, the wagering game server 107 may store wagering statistics and loyalty account balances, whereas the mobile phone 103 may store the persistent game state information and the customization preferences.

Casinos can provide incentives/benefits for creating and using accounts, so players are more likely to use the accounts while playing wagering games. As noted above, the accounts can track loyalty rewards, trophies, and other awards earned while playing wagering games. Some wagering games are episodic, so accounts can store persistent game state information that allows players to resume wagering games wherever they ended previous wagering game sessions. Additionally, account information can indicate player customizations, such as customized buttons on a touch screen, custom buttons that configures slots game paylines according to player preferences, player-selected music for celebration events (e.g., jackpots), custom avatar settings, etc.

Some embodiments of the wagering game system 100 can use the accounts to extend gaming experiences outside the casino. The system can allow players to access statistics, view rewards and trophies, and customize preferences by logging into a website. For example, a player may want the wagering game system to play a certain song to celebrate winning events, such as hitting big jackpots. If the song is stored on the player's mobile phone, the player can log into the account via mobile phone, and upload the song to the wagering game system. The player can also configure the mobile phone as an auxiliary input device, so that the phone behaves like a "remote control" for WGMs. The mobile phone can store account credentials, automatically connect to WGMs, and automatically log the player into an account.

Although FIG. 1 describes some embodiments, the following sections describe many other capabilities and embodiments.

Mobile Phone as Remote Input Device

In some instances, the mobile phones can operate as auxiliary input devices to the WGMs. That is, the mobile phones can serve as "remote controls," allowing players to move away from WGMs while playing games. The mobile phones may offer input capabilities not available on the WGMs, so the mobile phones may allow players to "unlock" certain game options and content. The discussion of FIG. 2 (see below) provides more details about how mobile phones can operate as auxiliary input devices.

Figure 2:
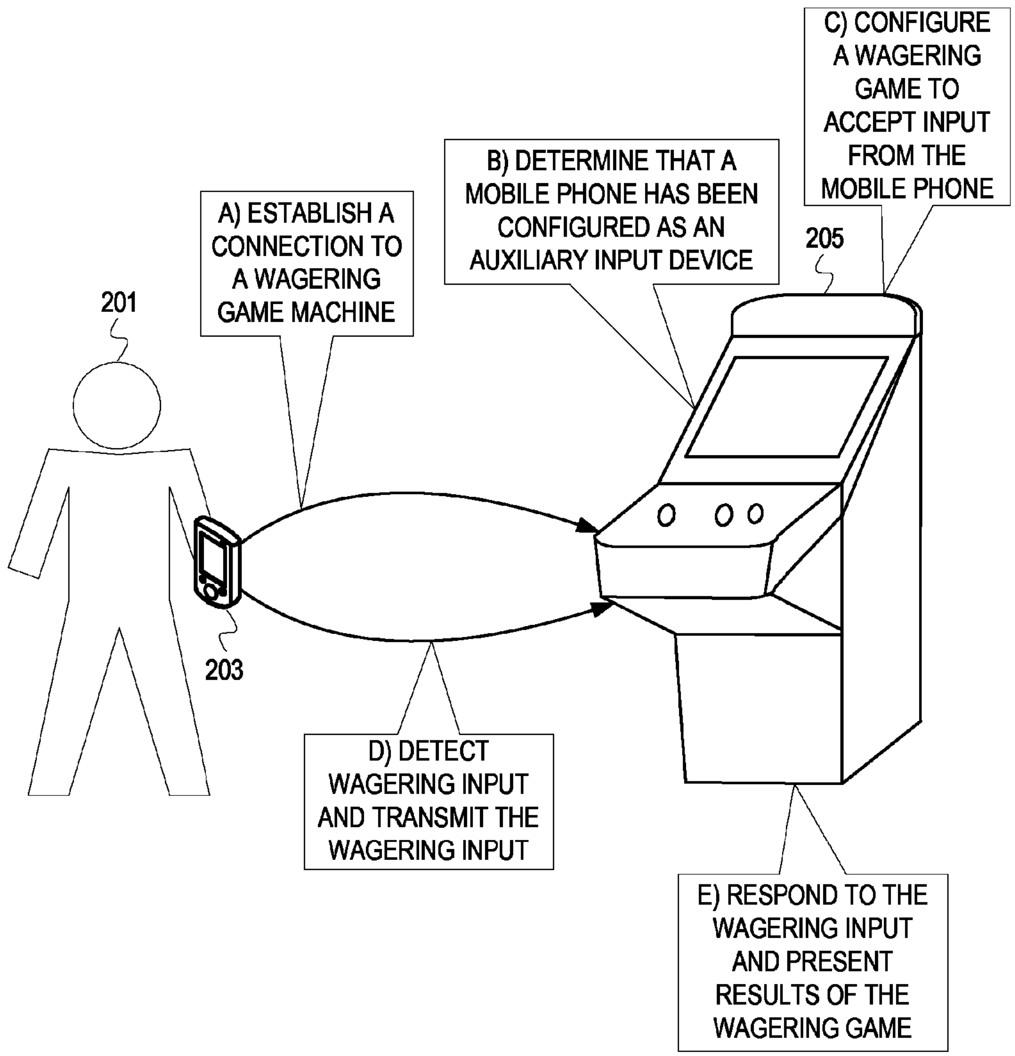
FIG. 2 is a flowchart depicting example operations for using a mobile phone 203 as an auxiliary input device for a WGM 205.

FIG. 2 is a flowchart depicting example operations for using a mobile phone 203 as an auxiliary input device for a WGM 205. In FIG. 2, the operations occur in stages A-E. At stage A, if the mobile phone 203 and WGM 205 have not already established a connection (e.g., by performing the operations of FIG. 1), the mobile phone 203 connects with the WGM 205. In some instances, the player 201 may request such a connection between the WGM 205 and mobile phone 203. For example, the player 201 can click a "Connect to Mobile Phone" button on the WGM's touch screen. The WGM 205 can determine mobile phones in proximity, and the WGM 205 can display a list of those mobile phones to the player 201. The list can identify the phones by telephone number or other identifiers. The player 201 can select the mobile phone 203 from the list. In response, the WGM 205 and mobile phone 203 establish a Bluetooth or other wireless connection. In other embodiments, instead of the WGM 205 detecting nearby phones, the mobile phone 203 can determine WGMs in proximity to the mobile phone 203. The mobile phone 203 can then display a list of WGMs in proximity to the mobile phone 203, so the player can select the desired WGM 205.

At stage B, the WGM 205 determines that the mobile phone 203 should be configured as an auxiliary input device. The WGM 205 may do this by retrieving the player's preferences from the player's account or from the player's mobile phone 203. The preferences can indicate a configuration of input buttons that should be displayed on the mobile phone 203 and/or by the WGM 205, based on games supported by the WGM 205. For example, for a slots game, the preferences may indicate that "Max Bet" and "Spin" buttons should be displayed on the mobile phone 203. The WGM 205 may also display a "Spin" button and other buttons used for betting. The preferences can also indicate other game elements (e.g., playing cards, financial information, wagering statistics, etc.) that should be displayed on the mobile phone 203. For example, for a video blackjack game, the preferences may indicate that the player's cards and winnings should be displayed on the mobile phone 203 rather than the WGM 205. In some instances, the WGM 205 configures the phone 203 without player preferences. For example, the WGM 205 can configure the phone's input options based on pre-selected defaults, or based on results of executing an input configuration wizard by which the player selects input configuration options.

At Stage C, the WGM 205 configures a wagering game to accept input from the mobile phone 203. For example, if the player preferences indicate that certain buttons should be displayed on the mobile phone 203, the WGM 205 configures a wagering game to receive certain inputs from the mobile phone 203. In some embodiments, the WGM 205 configures the wagering game to receive certain input data via one or more input ports configured to receive wireless data from the mobile phone 203. After the wagering game is configured to accept input from the mobile phone 203, the WGM 205 can start a wagering session, and notify the mobile phone 203 about the wagering session. In response, the mobile phone 203 can display input buttons, financial information, game elements, etc.

At stage D, the mobile phone 203 detects wagering game input and transmits the wagering input to the WGM 205. For example, the mobile phone 203 can detect that the player 101 placed a wager for a video blackjack game. In detecting the wager, the phone's client application (or other component) may detect that the player 201 has input a numerical wager amount, and clicked a "Bet" button. The mobile phone 203 can then transmit a message indicating the wager amount to the WGM 205. For a slots game, the mobile phone 203 may detect that the player pressed a "Spin" button. In turn, the mobile phone 203 can transmit, to the WGM 205, a message indicating that a spin was detected.

At stage E, the WGM 205 responds to the wagering game input and presents the wagering game. If the wagering game information includes a wager amount, the WGM's wagering game can receive the wager amount from the mobile phone 203, and display it to the player 101. Then, the game can "deal" cards for a video blackjack game. In some embodiments, the WGM's wagering game can instruct the mobile phone 203 to display the player's cards. For games other than blackjack, the WGM's wagering game can receive messages indicating various game play selections, and present results associated with those selections. Stage E concludes the flow shown in FIG. 2.

In addition to the capabilities described above, some embodiments can use mobile phones to track players' locations in casinos. A celebration server and other components can utilize player locations to present celebration events near the players. If players move around in casino, celebration events (e.g., music presentations, light shows, etc.) may follow them. Celebration events may accompany big wager awards (e.g., awards of $500), rare accomplishments (e.g., royal flush in poker), milestones (e.g., 100$^{th}$ win), etc.

Figure 3:
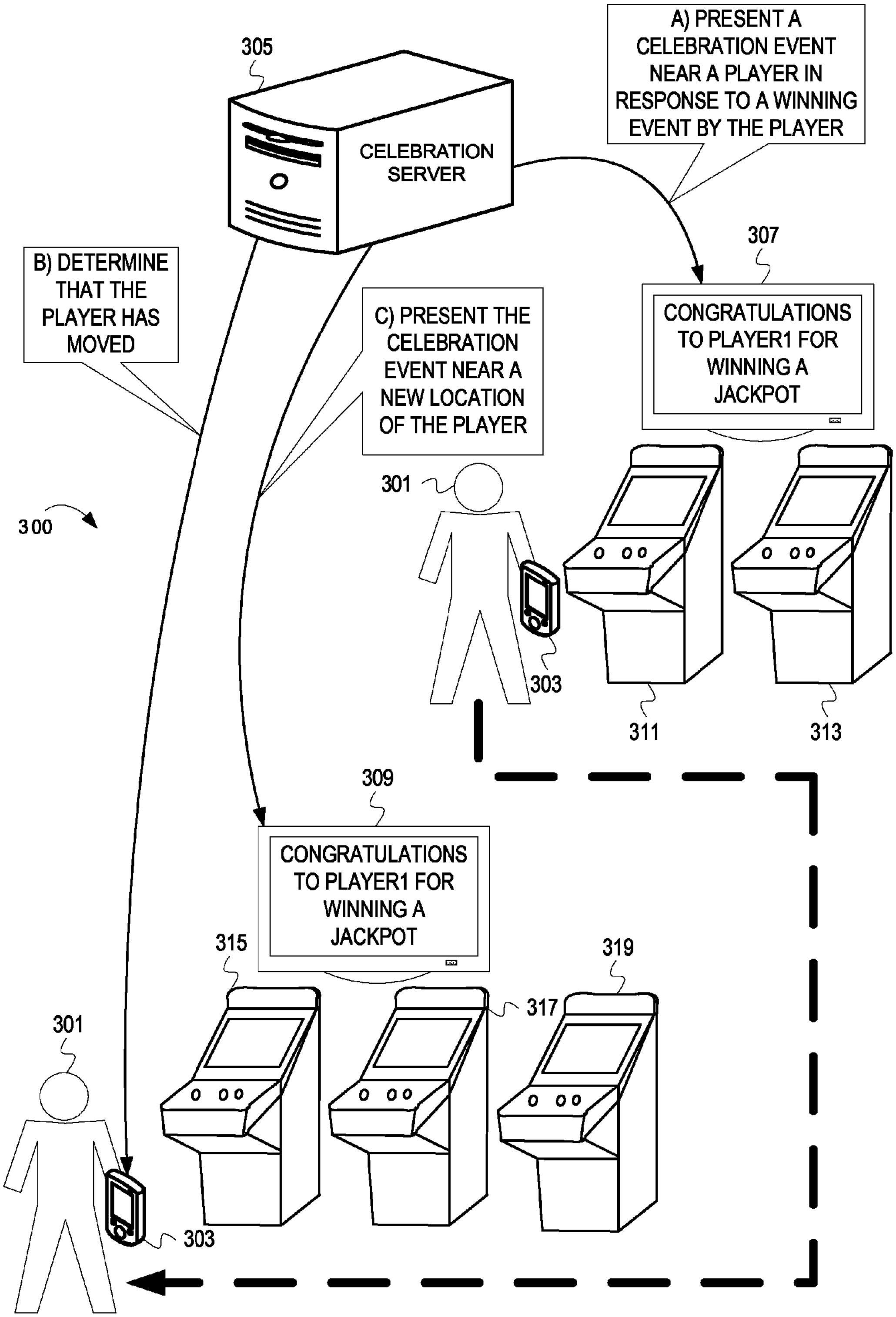
FIG. 3 is an example conceptual diagram showing a system and operations for presenting a celebration event based on a player's location.

FIG. 3 is an example conceptual diagram showing a system and operations for presenting a celebration event based on a player's location. In FIG. 3, the wagering game system 300 includes a mobile phone 303, celebration server 305, WGMs 311, 313, 315, 317, 319, and overhead display devices 307 and 309. At stage A, the celebration server 305 presents a celebration event near a player 301 in response to a winning event by the player 301. The celebration server 305 can determine the player's 301 location within a casino based on communications with a client application on the player's mobile phone 303. The mobile phone 303 can determine its location based on wireless signal triangulation, global positioning technologies, or any other suitable technology. For example, the WGMs 311, 313, 315, 317, 319 can wirelessly transmit WGM identifiers (e.g., using Bluetooth signals). The mobile phone's client application can receive the WGM identifiers, and notify the celebration server 305 about which WGMs are nearby. In another example, the celebration server 305 can query the client application for Global Positioning System (GPS) coordinates of the mobile phone 303. In another example, the celebration server 305 can determine the player's 301 location based on determining a WGM with which the mobile phone 303 is connected.

Using the location information, the celebration server 305 can determine presentation devices for presenting the celebration event. For example, the celebration server 305 determines presentation devices (e.g., video displays, speakers, lighting systems, etc.) near the player's location based on a map of the casino floor. In the example shown in FIG. 3, the celebration event is presented on an overhead display device 307. Although not shown, the celebration server 305 can present a light show, play music, play video, etc. in addition to the presentation on the display device 307. The celebration server 305 can also present the celebration event based on celebration preferences indicated in the player's 301 account. For example, the player 301 can set a celebration preference for songs that should be played for different events. As another example, the player preferences can indicate an image (e.g., a picture of the player) to be displayed during the celebration event. The celebration server 305 can determine the player's 301 celebration preferences from the mobile phone 303 and/or a wagering game server.

At stage B, after presenting the celebration event, the celebration server 305 determines that the player 301 moved. The mobile phone's client application can update the celebration server 305 about player's 301 movements (e.g., when the player's 101 location changes, on a periodic basis, etc.). In some instances, the mobile phone 303 detects movements because it detects new WGM identifiers. In other instances, the mobile phone detects changes in its GPS coordinates. In any case, the mobile phone 305 can notify the celebration server 305 about movements. In response to determining that the player 301 has moved, the celebration server 305 can determine presentation devices near the player's new location 305, and present the celebration event on the presentation devices. In FIG. 3, after the player 301 moves along the dotted path, the celebration server 305 presents the celebration event on the display device 309, which is near the player's 301 new location.

Although some embodiments use location tracking to move celebration events around a casino, other embodiments use location tracking to facilitate other capabilities. For example, in some wagering game systems, certain wagering game events can trigger play-while-away bonus games. Play-while-away bonus games allow players to automatically accrue bonus points and/or prizes while players are not playing wagering games. One play-while-away bonus game entails a virtual fish tank. In the virtual fish tank game, after a player triggers a bonus event in a wagering game, the player's fish is introduced into a virtual fish tank hosted by a casino. While the fish is in the fish tank, the fish can swim around (without input by the player) trying to collect as many coins as possible. The fish will "live" in the fish tank for a certain period of time The player 301 can check on the fish at kiosks in the wagering establishment, on WGMs, online through a Website provided by the wagering establishment, etc. In cities like Las Vegas, Nev., many different wagering establishments are in very close proximity to each other, so players tend to visit more than one wagering establishment in a short time period. As the player 301 visits different wagering establishments, the player's 301 fish can automatically be moved into fish tanks hosted by the different wagering establishments. The client application on the player's 301 mobile phone 303 can periodically report the player's 301 location to a web server that communicates with wagering servers associated with the wagering establishments. When the web server detects that the player 301 has moved from a first wagering establishment to a second wagering establishment, the web server can move the fish from a first fish tank associated with the first wagering establishment and to a second first tank associated with the second wagering establishment. Moving the fish can comprise removing an instance of the fish stored on a first wagering server and instantiating the instance of the fish on a second wagering game server. When the fish is moved, the web server can preserve state information of the fish (e.g., awards collected, bonus points accrued, etc.).

Although the celebration server 305 is depicted in FIG. 3 as a standalone entity, embodiments are not so limited. For example, the celebration server 305 can be integrated into a wagering game server.

In addition to the uses described above, players can use the mobile phones' location services to find wagering games in casinos and elsewhere. For example, a player can use the phone to specify a particular wagering game, such as Lucky Spades Video Poker. The mobile phone can find a near-by casino based on the player's location. The phone can also present a map show the how the casino has arranged its WGMs on the casino floor, and plot directions on the map, so the player can quickly find the game in the casino.

Figure 4:
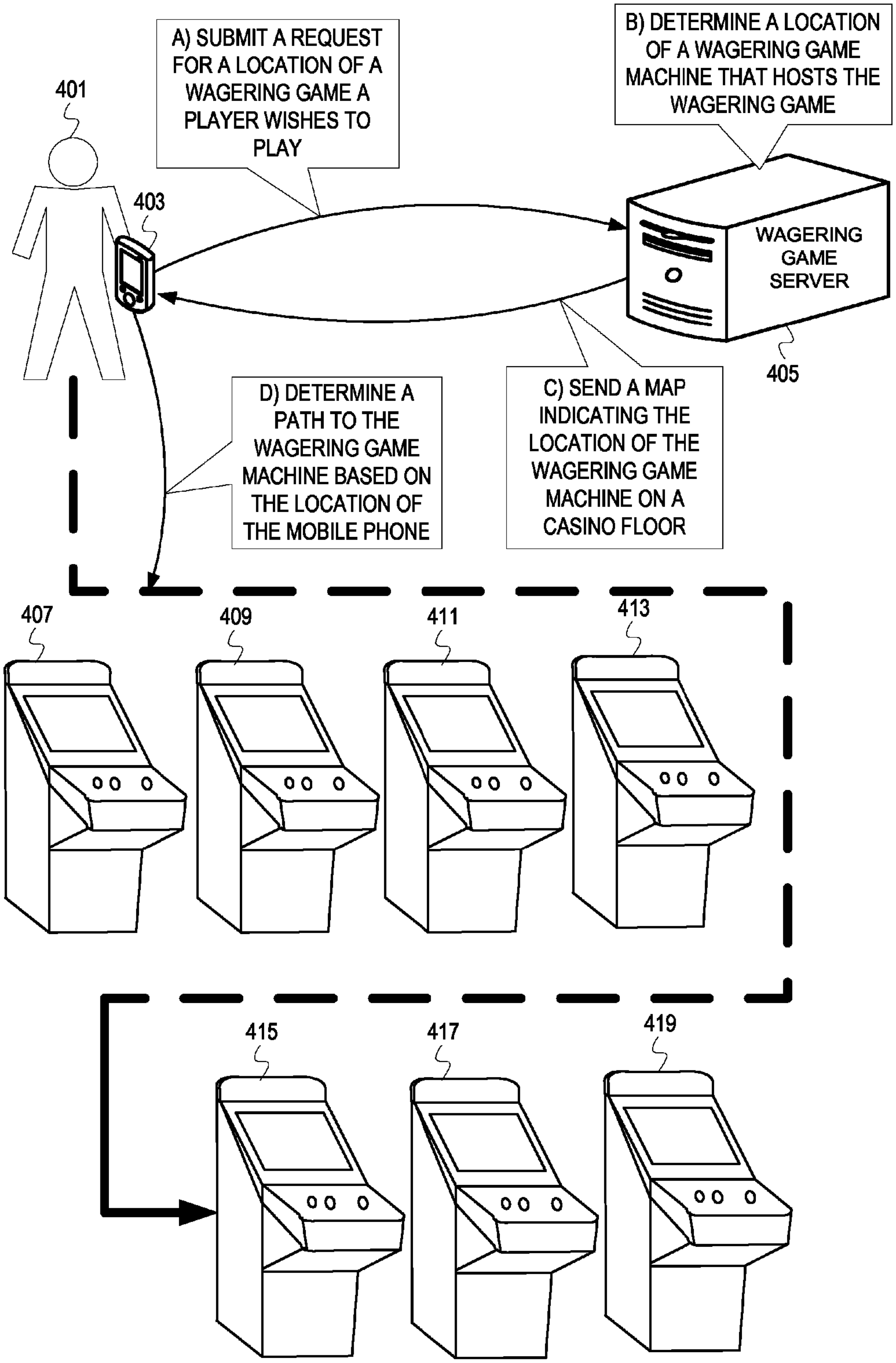
FIG. 4 is a conceptual diagram showing operations for using a mobile phone to direct a player to a particular WGM.

FIG. 4 is a conceptual diagram showing operations for using a mobile phone to direct a player to a particular WGM. In FIG. 4, the operations occur during stages A-D.

At stage A, a mobile phone 403 submits, to a wagering game server 405, a request for a location of a wagering game. For example, a player 401 may input a wagering game title into a client application (not shown) on the mobile phone 403. Alternatively, the client application may display suggestions from which the player chooses a wagering game. The suggestions may be based on wagering games previously played by the player 401, and/or wagering games played by other players who have played the wagering game title entered by the player 401. In other instances, the suggestions can be based on wagering games that the player's social contacts are currently playing, so the player 401 can find and join them in a casino. In yet other instances, the player's preferences may indicate the player's favorite wagering game. If the mobile phone 403 determines that the player 401 has entered a casino, the mobile phone 403 can automatically send a request for the location of the favorite wagering game.

Requesting the location of the desired wagering game can also include selecting a wagering game server to which the request is sent. For example, if the player 401 is outside a casino, the phone's client application may send the request to a web server (not shown). As part of the request, the mobile phone 403 can provide the player's location (e.g., GPS coordinates) to the web server. In response, the web server can determine a wagering establishment closest to player's 101 location, and query the appropriate wagering game server 405 for a location of WGMs that hosts the desired game.

At stage B, the wagering game server 405 determines a location of a WGM that offers the wagering game. The wagering game server 405 can determine WGMs that offer the wagering game based on a wagering game database. If multiple WGMs offer the wagering game, the wagering game server 405 can choose one. The wagering game server 405 may select a WGM based on availability (i.e., whether the WGM is currently occupied by a player), proximity to the player's location, the player's preferred denominations, the player's preferred location, etc. As shown in FIG. 4, the wagering game server 405 determines that the WGM 415 presents the desired wagering game. The wagering game server 405 can determine the WGM's location using a casino floor map, and return the map with an indication of the WGM's 415 location. The wagering game server 405 can return the map over a mobile phone network (e.g., a 3G network, a WiFi network, etc.). The wagering game 405 server can also indicate locations of other WGMs that present the desired wagering game. A casino floor may include WGMs 407, 409, 411, 413, 415, 417, and 419. Thus, the casino map can show how the WGMs 407, 409, 411, 413, 415, 417, and 419 are arranged on the casino floor. In the map, a symbol (e.g., an arrow, a dot, etc.) indicates the WGM's 415 location.

At stage C, the mobile phone 403 receives the map indicating the location of the WGM 415 on the casino floor.

At stage D, the mobile phone 403 uses the map to determine a path to the WGM 415 (e.g., based on the location of the mobile phone 403). The map can include information that allows the client application to determine distances between objects (e.g., WGMs, walls, furniture, etc.) on the map and walkways between the objects. For example, the map can indicate locations (e.g., in GPS coordinates) of the WGMs 407, 409, 411, 413, 415, 417, and 419. The map can shows that the WGMs 407, 409, 411, 413, 415, 417, and 419 are arranged in rows. As shown in FIG. 4, a first row comprises the WGMs 407, 409, 411, and 413, whereas a second row comprises the WGMS 415, 417, and 419. The map indicates that walkways exist behind the rows. The mobile phone 403 can determine a path to the desired wagering game machine. In addition, the mobile phone 403 can provide directions to the player 401, as the player 401 traverses the path. For example, as the player 401 approaches the WGM 413, the mobile phone 403 can prompt the player 401 to turn right. As another example, if the player 401 has not arrived at the casino, the mobile phone 403 can also determine a route to the casino from the player's location. If there are multiple WGMs capable of presenting the desired wagering game, the client application can determine which of the WGMs to direct the player. For example, the client application can determine which WGM is closest to the player 401 and direct the player 401 to the closest WGM. As another example, the client application can also prompt the player 401 to determine which of the WGMs the player 401 prefers.

When the player 401 arrives at the WGM 415, the mobile phone 403 can automatically log the player 401 into the WGM 415. To log the player into the WGM 415, the mobile phone 403 can establish a connection with the WGM 415 when the mobile phone 403 is in proximity to the WGM 415. In some instances, the mobile phone 403 uses the map and its location to determine proximity to the WGM 415. The mobile phone 403 can determine an identifier of the WGM 415 based on information received with or included in the map. The mobile phone 403 can connect to the WGM 415 using the identifier.

In some embodiments, the mobile phones can provide additional location-tracking functionality. Some casinos can offer promotions based on the players' locations. For example, a casino may offer a virtual trophy for visiting multiple casinos and/or businesses (e.g., restaurants, shops, etc.). The mobile phones can track player movements and notify a casino's web server (or other component) when players enter certain properties. After players enter all properties necessary for the trophy, the casino's web server can award the virtual trophies by adding the trophies to player accounts. As another example, casinos may offer players free credits, bonus games, or other game-related incentives as they detect players within a certain distance of the casinos. The casinos can use these incentives to motivate players to go inside and play wagering games.

Example Operating Environment

This section describes an example operating environment and presents structural aspects of some embodiments. This section includes discussion about mobile phone architectures, and wagering game networks.

Mobile Phone Architectures

Figure 5:
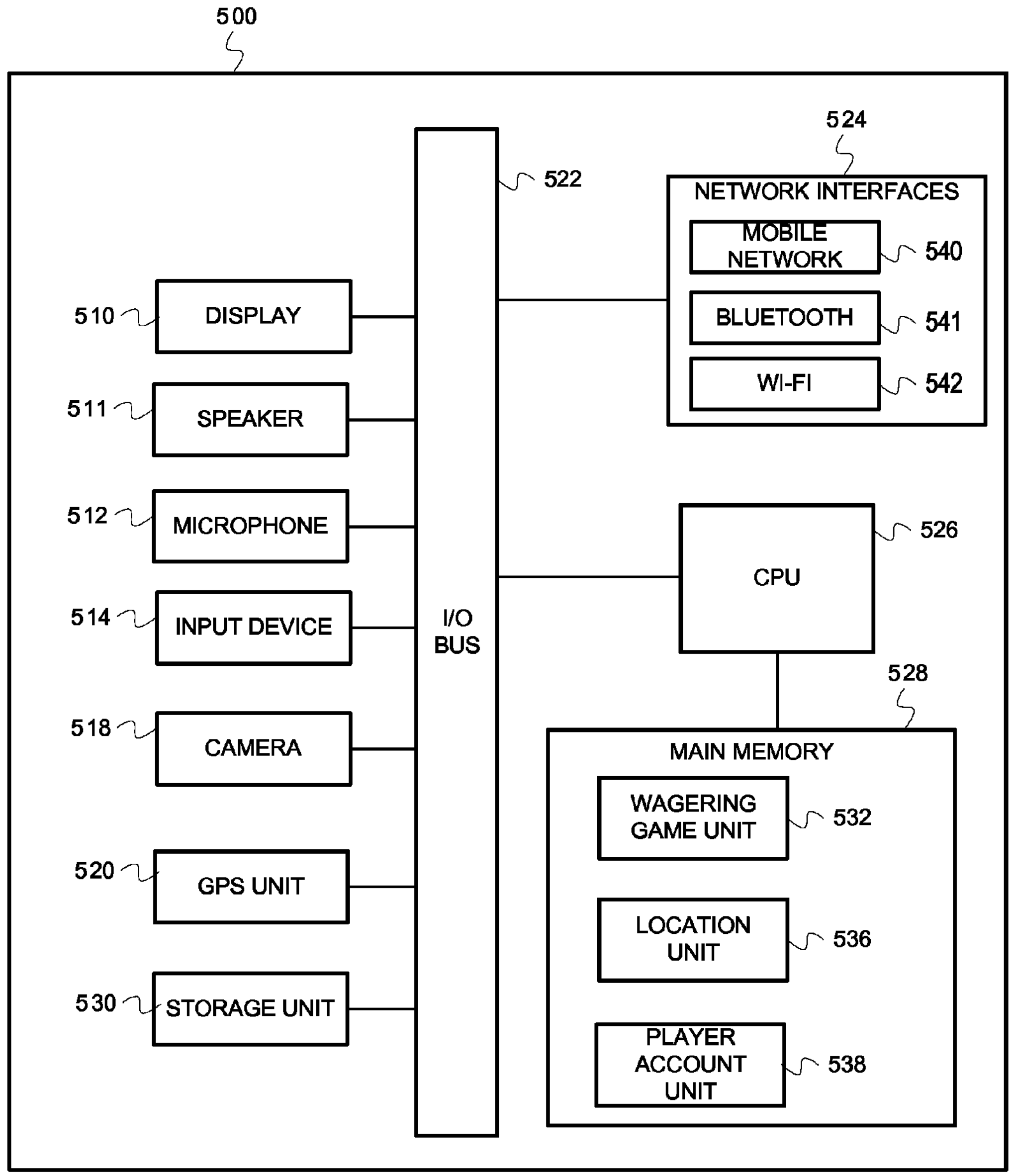
FIG. 5 is a block diagram illustrating a mobile phone architecture, according to example embodiments of the invention.

FIG. 5 is a block diagram illustrating a mobile phone architecture, according to example embodiments of the invention. As shown in FIG. 5, a mobile phone 500 can include a central processing unit (CPU) 526 connected to main memory 528. The CPU 526 can include any suitable processor, such as an Advanced RISC Machine (ARM) processor, Intel® PXA800F processor, etc. The CPU 526 is also connected to an input/output (I/O) bus 522, which can include any suitable bus technologies, such as an $I^2C$ bus (inter-integrated circuit). The I/O bus 522 is connected to a display 510, a speaker 511, a microphone 512, an input device 514, a camera 518, global positioning system unit 520, and storage unit 530. The display 510 can comprise a liquid crystal display (LCD). The speaker 511 presents audio associated with telephone calls, notifications (e.g., incoming calls, text messages, etc.), games, etc. The GPS unit 520 can determine geographic location information based on information received from GPS satellites. In some instances, the mobile phone 500 includes components capable of determining geographic location using other means, such as gyroscopes, signals from terrestrial beacons, etc. The I/O bus 522 is also connected to interfaces 524. The I/O interfaces 524 include a mobile network interface 541, a Bluetooth interface, and an Institute of Electrical and Electronics Engineers (IEEE) 802.11 (Wi-Fi) interface 542. The mobile network interface 540 can communicate with Global System for Mobile Communications (GSM) networks, Code Division Multiple Access (CDMA) networks, etc.

The main memory 528 includes a location unit 536, a wagering game unit 532, and a player account unit 538. The location unit 536 can determine locations of WGMs, paths to WGMs, paths to casinos, and other location-based information. In some instances, the location unit 536 uses geographic location information from the GPS unit 520 and maps received from remote machines (e.g., wagering game servers, web servers, etc.).

In one embodiment, the wagering game unit 532 can present wagering games, such as video poker, video black jack, video slots, video lottery, etc., in whole or part. The wagering game unit 532 can, at locations where wager gaming is not permitted, disable monetary wagering (e.g., based on location information determined by the GPS unit 520 and/or the location unit 532). The wagering game unit 532 can use location information to determine whether players are eligible for promotions. The account unit 538 can automatically connect to WGMs and automatically log-in players.

In some embodiments, one or more of the wagering game unit 532, location unit 536, and account unit 538 constitute a client application, as described in the discussion of FIGS. 1-4.

The mobile phone 500 can include additional components and/or more than one of each component shown in FIG. 5. For example, in some embodiments, the mobile phone 500 can include a touch screen display, qwerty keyboard, etc. In one embodiment, any of the components can be integrated or subdivided.

Any component described herein can include hardware, firmware, and/or machine-readable storage media including instructions for performing the operations described herein. Machine-readable storage media includes any mechanism that stores information in a form readable by a machine (e.g., a wagering game machine, computer, etc.). For example, machine-readable storage media can be configured as read only memory (ROM), random access memory (RAM), or any other suitable configuration. Machine-readable storage media can be embodied as any suitable magnetic storage media (e.g., magnetic disk media), optical storage media (e.g. DVD media), semi-conductor storage media (e.g., flash memory machines), etc. Any components described herein can also include signal media, which can include media for transmitting software over a network, such as fiber optic media, Ethernet media, etc.

Although embodiments are described with reference to “mobile phones,” some embodiments can work with mobile devices that do not include mobile telephony. For example, instead of mobile phones, embodiments can include mobile computing devices capable of wireless communications (WiFi, Bluetooth, etc.). More specifically, embodiments can include mobile devices such as Apple’s iPod Touch® devices, Apple’s iPad devices, wireless-enable laptop computers and personal digital assistants, etc.

While FIG. 5 describes an example mobile phone architecture, this section continues with a discussion of wagering game networks.

Wagering Game Networks

Figure 6:
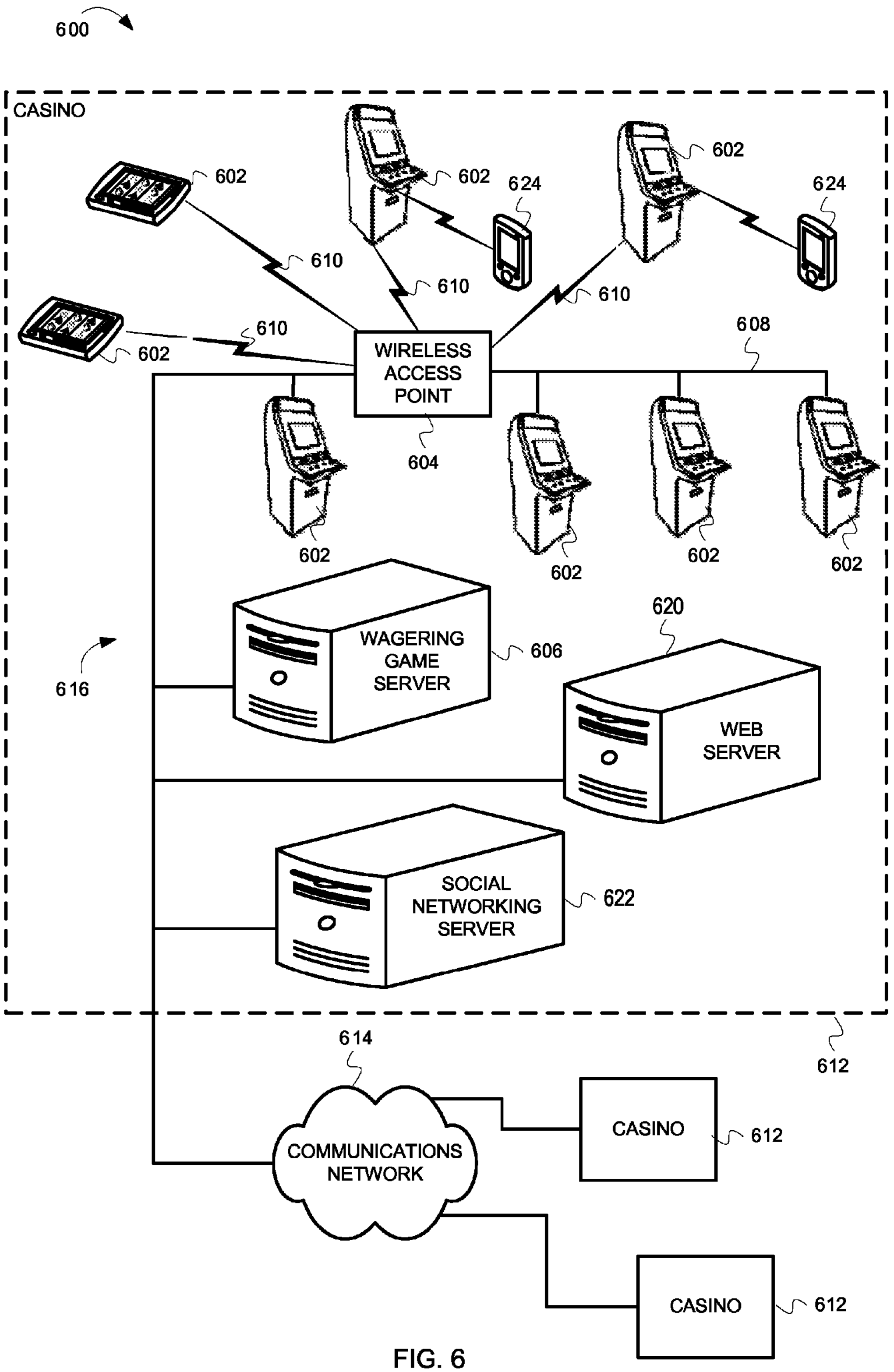
FIG. 6 is a block diagram illustrating a wagering game network 600, according to example embodiments of the invention.

FIG. 6 is a block diagram illustrating a wagering game network 600, according to example embodiments of the invention. As shown in FIG. 6, the wagering game network 600 includes a plurality of casinos 612 connected to a communications network 614.

Each casino 612 includes a local area network 616, which includes an access point 604, a wagering game server 606, wagering game machines 602, a web server 620, and a social networking server 622. The access point 604 provides wireless communication links 610 and wired communication links 608. The wired and wireless communication links can employ any suitable connection technology, such as Bluetooth, 802.11, Ethernet, public switched telephone networks, SONET, etc. In some embodiments, the wagering game server 606 can serve wagering games and distribute content to devices located in other casinos 612 or at other locations on the communications network 614. In some instances, the wagering game server 606 includes player account information, while in other instances other components include such information.

The wagering game machines 602 described herein can take any suitable form, such as floor standing models, handheld mobile units, bartop models, workstation-type console models, etc. Further, the wagering game machines 602 can be primarily dedicated for use in conducting wagering games, or can include non-dedicated devices, such as mobile phones, personal digital assistants, personal computers, etc. In one embodiment, the wagering game network 600 can include other network devices, such as accounting servers, wide area progressive servers, player tracking servers, and/or other devices suitable for use in connection with embodiments of the invention.

In some embodiments, wagering game machines 602 and wagering game servers 606 work together such that a wagering game machine 602 can be operated as a thin, thick, or intermediate client. For example, one or more elements of game play may be controlled by the wagering game machine 602 (client) or the wagering game server 606 (server). Game play elements can include executable game code, lookup tables, configuration files, game outcome, audio or visual representations of the game, game assets or the like. In a thin-client example, the wagering game server 606 can perform functions such as determining game outcome or managing assets, while the wagering game machine 602 can present a graphical representation of such outcome or asset modification to the user (e.g., player). In a thick-client example, the wagering game machines 602 can determine game outcomes and communicate the outcomes to the wagering game server 606 for recording or managing a player’s account.

As shown, the wagering game machines 602 can interact with mobile phones 624, and perform any of the operations described herein. Additionally, the mobile phones 624 can interact with the wagering game server 606 and web server 620.

In some embodiments, either the wagering game machines 602 (client) or the wagering game server 606 can provide functionality that is not directly related to game play. For example, account transactions and account rules may be managed centrally (e.g., by the wagering game server 606) or locally (e.g., by the wagering game machine 602). Other functionality not directly related to game play may include power management, presentation of advertising, software or firmware updates, system quality or security checks, etc. For example, the wagering game server can present a celebration event near a location of a player. If the wagering game server determines that a player has moved, the wagering game server can present the celebration event near the player’s new location.

The web server 620 can allow the mobile phones 624 and other devices to access player account information through a web interface. Players can utilize the web interface to view their account information, provide preferences to customize their gaming experiences, configure the mobile phones 624 as auxiliary input devices, download mobile versions of wagering games to the mobile phones 624, access maps of wagering game establishments, etc.

The social networking server 622 can provide a web-based social networking interface that allows players to share information about activities within wagering establishments. The social networking server 622 can post status updates to a player’s social networking Webpage based receiving the status updates from the player’s mobile phone. For example, the mobile phone can transmit a status update that indicates that the player is playing a particular wagering game. In response, the social networking server 622 can post the status update to the player’s social networking webpage.

Any of the wagering game network components (e.g., the wagering game machines 602) can include hardware and machine-readable storage media including instructions for performing the operations described herein.

More Example Operations

This section describes additional operations of some embodiments of the invention. In the discussion below, the flow diagrams will be described with reference to the block diagrams presented above. However, in some embodiments, the operations can be performed by components not described in the block diagrams.

In certain embodiments, the operations can be performed by executing instructions residing on machine-readable storage media (e.g., software), while in other embodiments, the operations can be performed by hardware and/or other components (e.g., firmware). In some embodiments, the operations can be performed in series, while in other embodiments, one or more of the operations can be performed in parallel. Moreover, some embodiments can perform less than all the operations shown in any flow diagram. The section will discuss FIGS. 7-10.

Figure 7:
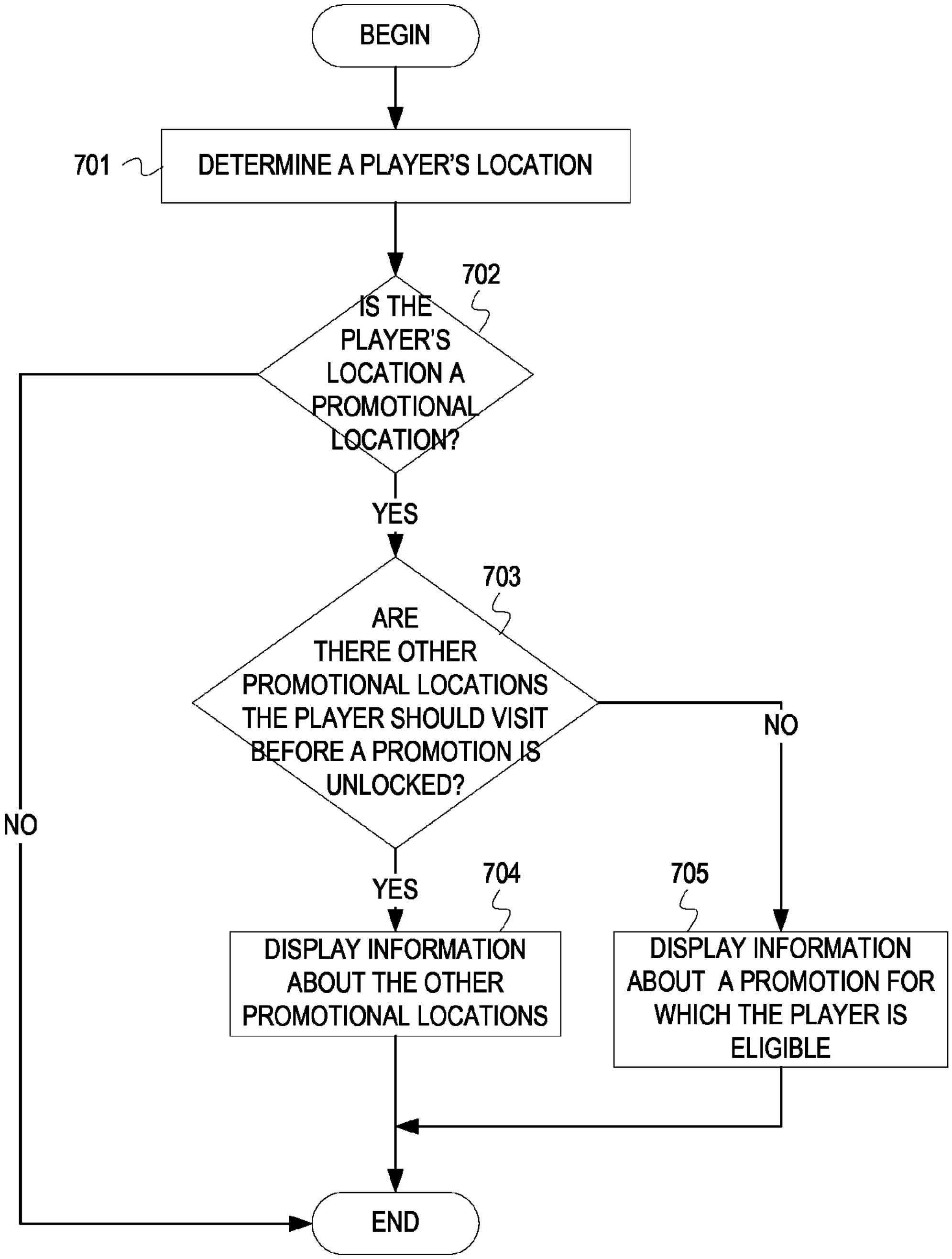
FIG. 7 is flowchart of example operations for offering bonuses to a player based on the player's location.

FIG. 7 is flowchart of example operations for offering bonuses to a player based on the player's location. Flow begins at block 701, where a client application on a mobile phone determines a player's location. For example, the client application determines the player's location based on GPS coordinates. As another example, the client application determines the player's location based on triangulation of cellular signals emitted by cellular towers and received by the mobile phone. Flow continues at block 702.

At block 702, the client application determines if the location is a promotional location. For example, a wagering game server can provide the client application with an indication of promotional locations. The client application can determine whether the location is a promotional location GPS coordinates of the mobile phone and GPS coordinates of the promotional location. As another example, the client application can periodically report the player's location to a wagering game server that maintains the promotional locations. In response to receiving the player's location from the client application, the wagering game server can determine whether the player's location corresponds to one of the promotional locations. If the player's location is a promotional location, flow continues at block 703. If the player's location is not a promotional location, flow ends.

At block 703, the client application determines whether there are other promotional locations the player should visit before a promotion is unlocked. For example, the player may be participating in a scavenger hunt. Before receiving a prize, the player must visit multiple casinos. The promotional locations can be a group of affiliated wagering establishments (e.g., casinos). After the player visits all the wagering establishments, the player receives a prize (e.g., free play, a free meal, elite player status, etc.). As a player visits promotional locations, the client application or web server can record an indication that promotional location has been visited. If the web server maintains the list of promotional location visited by the player, the web server can return information indicating other promotional locations that must be visited. If other locations should be visited before a promotion is awarded, flow continues at block 704. If other no other promotional locations should be visited, flow continues at block 705.

At block 704, other promotion locations must be visited, so the client application displays information about the other promotional locations. For example, the client application can display addresses, names, etc. of the other promotional locations. As another example, a clue about another promotional location can be displayed to a player participating in a scavenger hunt. In some embodiments, the server keeps track of promotional locations to be visited, while in other embodiments, the mobile phone keeps track of such information. From block 704, flow ends.

At block 705, if the player has visited all of the promotional locations, the client application displays information about a promotion for which the player is eligible. For example, the client application can display an indication that the player is eligible for free play (e.g., a bonus spin, a free hand of poker, etc.). The free play can be automatically associated with the player's account, so that the player can redeem the free play by logging-in to the player account. In some instances, even though the player must visit more than one promotional location to win a large promotion, the player may receive small promotions for visiting each promotional location. For example, a player can earn elite status after visiting a group of affiliated wagering establishments. However, the player may receive free play at each of the wagering establishments to encourage the player to participate in wagering games at each of the wagering establishments.

In addition to the operations noted above, client applications on the mobile phones can utilize location information to automatically update players' social networking status (e.g., when players visit a particular casino). In addition, the client application can update the social networking status based on the player's activity within the casino. For example, the client application can update the player's status to indicate that the player has won a jackpot.

Figure 8:
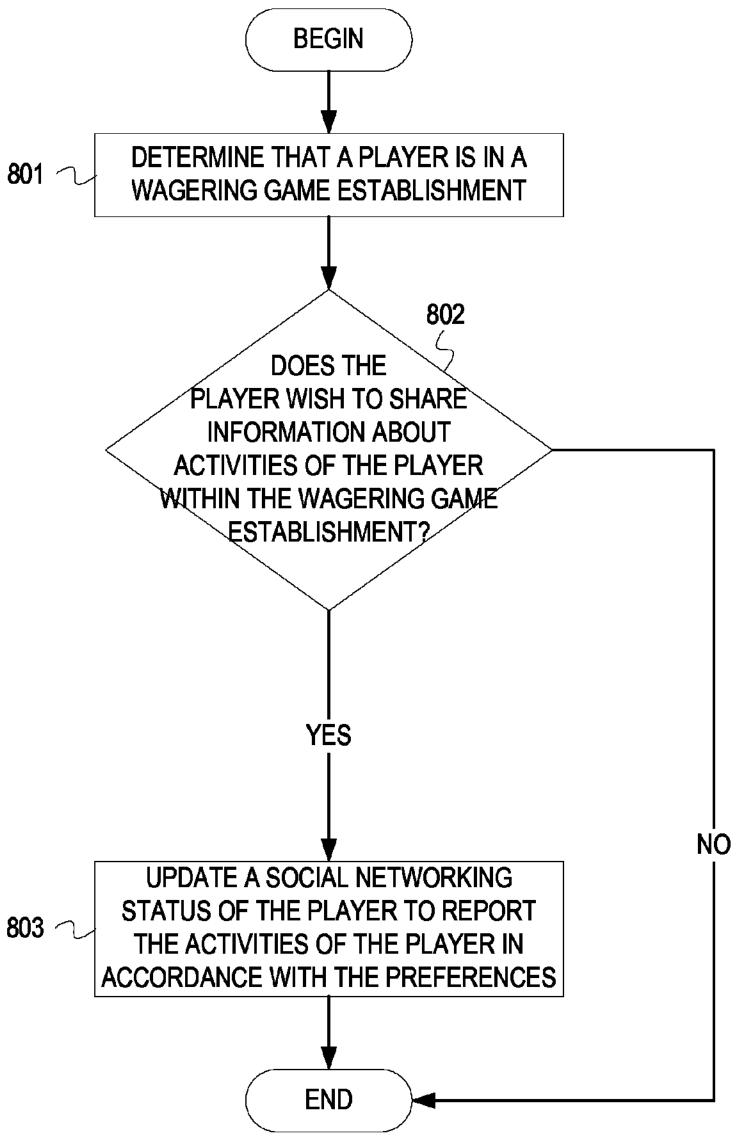
FIG. 8 is a flowchart of example operations for automatically updating a player's social networking status based on the player's location.

FIG. 8 is a flowchart of example operations for automatically updating a player's social networking status based on the player's location. Flow begins at block 801, where a client application on a mobile phone determines that the player is in a wagering establishment. For example, the client application can determine that the player is in the wagering game establishment because the mobile phone's GPS coordinates correspond to the wagering game establishment's GPS coordinates. As another example, the client application can determine that the player is in the wagering game establishment because the player has used the mobile phone to log into a WGM. Flow continues at block 802.

At block 802, the client application determines whether the player wishes to share information about activities (e.g., wagering games played, wins, wagering statistics, etc.) within the wagering game establishment. In some embodiments, player preferences stored in the player's account indicate whether the player wants to share information. In other embodiments, the mobile phone's client application prompts the player for input indicating a sharing preference. If the player wishes to share information about the player's activities, flow continues at block 803. If the player does not wish to share information about the player's activities, flow ends.

At block 803, the client application updates a social networking status of the player. In some instances, after the phone's client logs the player into the WGM, the client receives, from the WGM, information about the player's activities (e.g., games played, game results, time of play, etc.). Wagering game servers can also send player activity information to the client application. After the client application determines the player's activities, the client can update the player's social networking status. For example, after the client application determines the player has won a jackpot, the client application updates the player's status on a social networking website. In some instances, the mobile phone's client application updates certain information, according to the player's preference information. For example, the player's preferences may indicate that updates can include win notices, but not win amounts. Thus, the client application may create a status update stating, "Player1 has won a jackpot on Reel 'Em In." In some embodiments, the client application can update the social networking status by sending, to a social networking server, a text message indicating the status update. As another example, the client application can determine that the player wishes to share the player's wagering statistics based on the player's preferences. When the mobile phone receives the player's statistics, the mobile phone can create a status update that includes the statistics. In some embodiments, the mobile phone can submit the status update through an application programming interface (API) of the social networking server.

Some WGMs may allow mobile phones to download mobile versions of wagering games. The mobile phones can connect to WGMs (or other devices), and receive the mobile wagering games. In some instances, the mobile games can enable game play identical to wagering games appearing on the WMGs. Casinos may release mobile games to enable players to preview upcoming releases, play wagering games while away from casinos, and play non-wagering versions of casino games. In some instances, the mobile wagering games can utilize location services of the mobile phones to allow the players to engage in monetary wagering when players are in jurisdictions that allow wagering. When the players are in jurisdictions that do not allow monetary wagering, non-wagering versions of the mobile games can be activated. Non-wagering mobile games can allow players to unlock content (e.g., levels in an episodic game, trophies, etc.) and/or promotions (e.g., free play, loyalty rewards, etc.) that can be redeemed in casinos.

Figure 9:
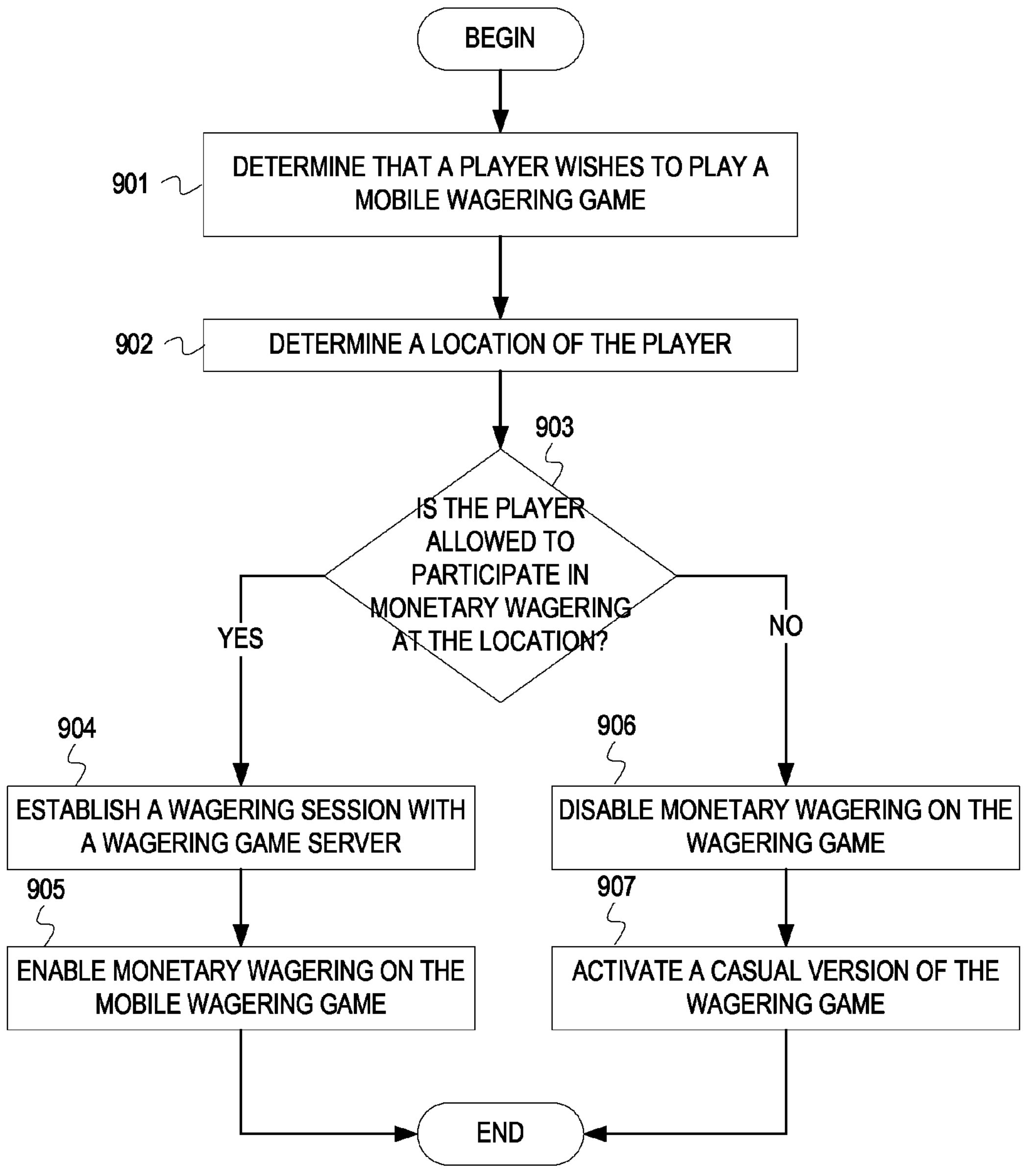
FIG. 9 is a flowchart showing operations for enabling/disabling monetary wagering in a mobile wagering game.

FIG. 9 is a flowchart showing operations for enabling/disabling monetary wagering in a mobile wagering game. Flow begins at block 901, where a wagering unit on a mobile phone determines that a player wishes to play a mobile wagering game. For example, the wagering game unit detects player input for launching a mobile wagering game, such as a mobile slots game. Flow continues at block 902.

At block 902, the phone's wagering game unit determines a location. For example, the wagering game unit determines GPS coordinates of the mobile phone.

At block 903, the phone's wagering game unit determines whether the player is allowed to participate in monetary wagering at the location. For example, the wagering game unit may determine a city and state based on GPS coordinates of the mobile phone. If wager gaming is permitted at such a location (e.g., Las Vegas, Nev.), the wagering game unit enables monetary wagering for the mobile game. As another example, the wagering game unit may enable wager gaming if the mobile phone is connected to a wagering game network associated with a casino. In addition to determining whether the player is allowed to participate in monetary wagering, the wagering game unit may also determine whether the player wishes to participate in monetary wagering (if allowed). If the player is allowed to participate in monetary wagering, flow continues at block 904. If the player is not allowed to participate in monetary wagering, flow continues at block 906.

At block 904, the wagering game unit establishes a wagering session with a wagering game server. The wagering game unit can establish a wagering session with a wagering game server closest to the player's location. For example, the wagering game unit determines a wagering establishment that is closest to the player's GPS coordinates. The wagering game unit can establish the wagering session with a wagering game server in the wagering establishment through a web server associated with the wagering game server. As another example, the wagering game unit determines that the mobile phone is within range of a wagering establishment's wireless network. The wagering game unit can establish the wagering session with the wagering game server through the wagering establishment's wireless network. The wagering game server can determine a wagering account of the player to associate with the session based on an identifier provided by the wagering game unit. Flow continues at block 905.

At block 905, the player is allowed to participate in monetary wagering, so the wagering game unit enables monetary wagering on the mobile wagering game. While the player is playing the mobile wagering game, the wagering game unit can communicate with the wagering game server to subtract wagers from the player's wagering account and add wins the player's wagering account. In some embodiments, the wagering game unit determines game results, and notifies the wagering game server of the results. In other embodiments, a wagering game server determines game outcomes, and transmits indications of the game outcomes to the wagering game unit, so that the wagering game unit can present the game outcomes and wagering account balances to the player.

At block 906, the player is not allowed to participate in monetary wagering, so the wagering game unit disables monetary wagering on the wagering game. Flow continues at block 907.

At block 907, the wagering game unit activates a "casual" version of the mobile wagering game. For example, the wagering game unit can allow the player to play the mobile wagering game with fictitious money/credits. Although players cannot wager or win money by playing casual games, the players can unlock content/promotions that can be redeemed in wagering establishments. For example, the player can pick-up a casual version of an episodic wagering game at a level the player left-off in a wagering establishment. As the player plays the casual version, the player can unlock additional levels. When the player returns to a wagering establishment to play the game, the player can play the unlocked levels and/or continue playing where the casual game left-off. As another example, the wagering game unit can keep track of the player's time spent playing the casual version. When the player has played the casual version for a certain amount of time, the wagering game unit can offer the player free play on a corresponding wagering game in a wagering establishment. As another example, the player can accrue loyalty rewards for playing casual versions of mobile wagering games.

Some wagering games allow multiple players to collaboratively play a wagering game on multiple WGMs ("multi-player wagering game"). Traditionally, players participate in multiplayer wagering games by using WGMs arranged in a bank. Some embodiments enable multiplayer wagering games to use mobile phones to connect with WGMs, invite others to participate in the multiplayer game, play the multi-player games in machines distributed across one or more casinos.

Figure 10:
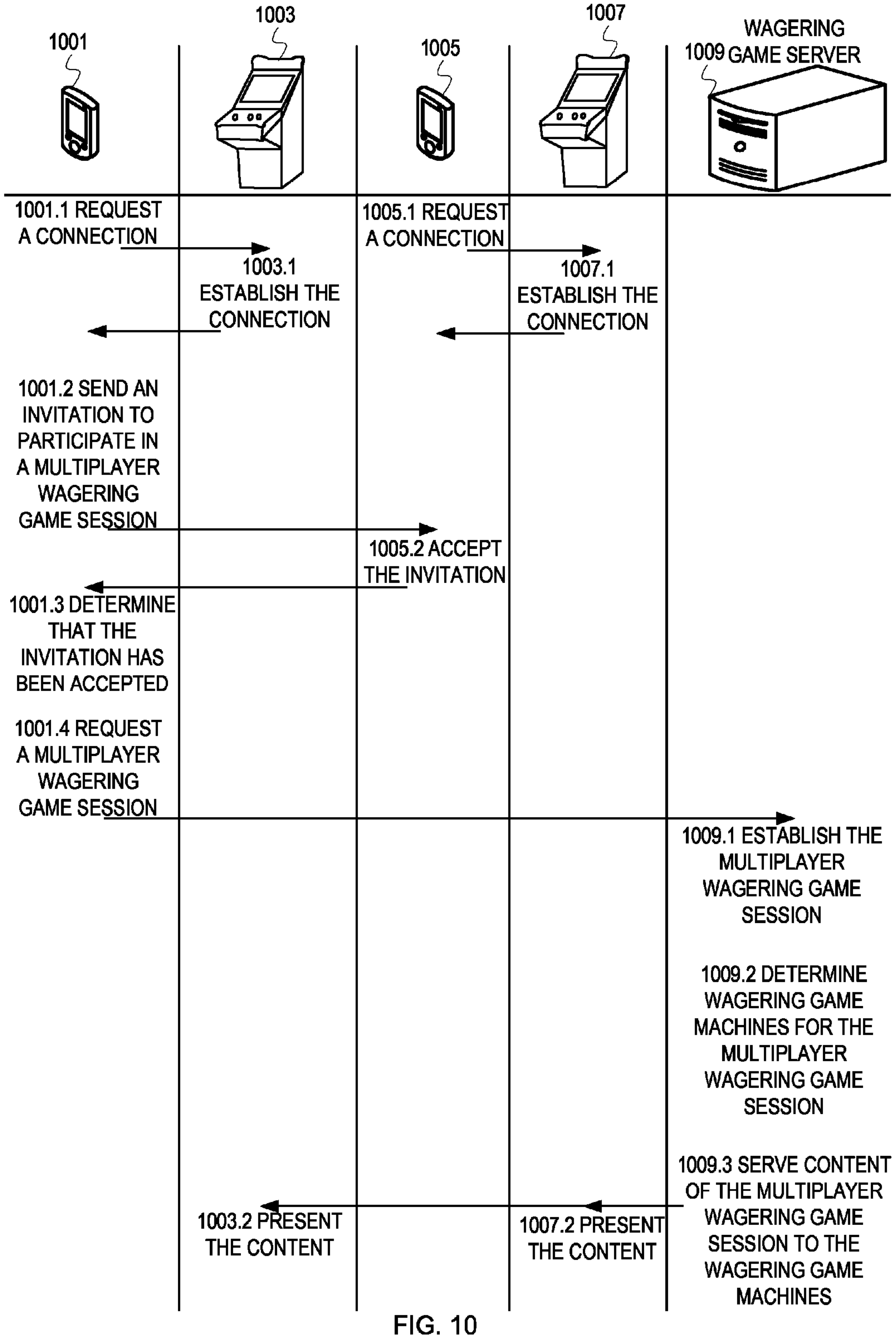
FIG. 10 shows a conceptual diagram including operations for utilizing mobile phones in process for serving multiplayer wagering games to WGMs.

FIG. 10 shows a conceptual diagram including operations for utilizing mobile phones in process for serving multiplayer wagering games to WGMs. In FIG. 10, WGMs 1003 and 1007 are in communication with a wagering game server 1009. The WGMs 1003 and 1007 support a wagering game that can be played by multiple players. In this example, the WGMs 1003 and 1007 are members of different banks of WGMs in a wagering game establishment. In other examples, the WGMs 1003 and 1007 may be in different wagering game establishments.

At stage 1001.1, a mobile phone 1001 requests a connection with the WGM 1003. The connection request can include an automatic log-in request, as described above.

At stage 1003.1, the WGM 1003 establishes the connection with the mobile phone 1001. For example, the WGM 1003 can access a player's account, retrieve the player's account information, and configure the wagering game based on the player's account information. The WGM 1003 can transmit an acknowledgement to the mobile phone 1001 indicating that the connection was established successfully. The acknowledgment can include the WGM's identifier.

At stage 1005.1, a mobile phone 1005 requests a connection with the WGM 1007. At stage 1007.1, the WGM 1007 establishes the connection. Although stages 1001.1 and 1003.1 are depicted as occurring in parallel with stages 1005.1 and 1007.1, the stages 1001.1 and 1003.1 may occur at different times than stages 1005.1 and 1007.1.

At stage 1001.2, the mobile phone 1001 sends an invitation to participate in a multiplayer wagering game session to a player associated with the mobile phone 1005. Sending an invitation to participate in the wagering game session can comprise determining participants selected to participate. For example, a player associated with the mobile phone 1001 selects the player associated with the mobile phone 1005 from contacts stored in the mobile phone 1005. The mobile phone 1001 can send the invitation in a text message to the mobile phone 1005, an e-mail sent to an account associated with the mobile phone 1005, etc. The invitation can identify the wagering game that was selected for the multiplayer wagering game session so that the invited player can decide whether to participate. Although FIG. 10 depicts stage 1001.2 as occurring directly after stages 1003.1 and 1007.1, the stage 1001.2 may not occur directly after the stages 1003.1 and 1007.1.

At stage 1005.2, the mobile phone 1005 accepts the invitation. Accepting the invitation may include prompting the player for input indicating whether the player accepts the invitation. The mobile phone 1005 can transmit an acknowledgement to the mobile phone 1001, where the acknowledgement indicates that the invitation has been accepted. For example, the mobile phone 1005 transmits a text message indicating acceptance to the mobile phone 1001. The mobile phone 1005 can also transmit, to the mobile phone 1001, an identifier associated with the WGM 1007 to indicate that the mobile phone is connected to the WGM 1007.

At stage 1001.3, the mobile phone 1001 determines that the invitation has been accepted. For example, the mobile phone 1001 receives the text message indicating acceptance from the mobile phone 1001.

At stage 1001.4, the mobile phone 1001 requests a multiplayer wagering session from the wagering game server 1009. In the request, the mobile phone 1001 indicates devices associated with participants of the multiplayer wagering game session. For example, the mobile phone 1001 can include identifiers of the mobile phones 1001 and 1005 (e.g., phone numbers) in the request. As another example, the mobile phone 1005 can include identifiers of the WGMs 1003 and 1007 in the request. The mobile phone 1001 can transmit the request to the wagering game server 1009 directly. For example, the mobile phone 1001 can connect to the wagering game server 1009 through a wireless network in the wagering establishment. The mobile phone 1001 can also transmit the request to the wagering game server 1009 indirectly. For example, the mobile phone 1001 can instruct the WGM 1003 to transmit the request to the wagering game server 1009. As another example, the mobile phone 1001 can transmit the request to a web server associated with the wagering game server 1009. In response, the web server can forward the request to the wagering game server 1009.

At stage 1009.1, the wagering game server 1009 establishes the multiplayer wagering game session. For example, the wagering game server 1009 determines that the mobile phones 1001 and 1005 are indicated in the request. The wagering game server 1009 can transmit acknowledgements (e.g., text messages) to the mobile phones 1001 and 1005 indicating that the multiplayer wagering game session has been established. In some embodiments, the wagering game server 1009 transmits acknowledgements to the WGMs 1003 and 1007 indicating that the multiplayer wagering game session has been established. In response, the WGMs 1003 and 1007 can display the indication to the participants.

At stage 1009.2, the wagering game server 1009 determines WGMs for the wagering game session. As noted above, the requests can indicate WGMs and mobile phones. Thus, the wagering game server 1009 selects the WGMs 1003 and 1007.

At stage 1009.3, the wagering game server 1009 serves content for the multiplayer wagering game to the WGMs 1003 and 1007. For example, the wagering game server 1009 determines game outcomes and serves the game outcomes to the WGMs 1003 and 1007. As another example, the wagering game server 1009 can receive a bet from a player at WGM 1007. The wagering game server 1009 can transmit information about the bet to the WGM 1003, so that the bet can be displayed to the player at the WGM 1003. If the WGMs 1003 and 1007 are in different wagering establishments, more than one wagering game server may be involved in serving the content to the WGMs 1003 and 1007. For example, the WGM 1003 may be in the same wagering establishment as the wagering game server 1009, while the WGM 1007 is in a different wagering establishment. Because the multiplayer wagering session was initiated with the wagering game server 1009, the wagering game server 1009 can act as a primary wagering game server. The wagering game server 1009 can communicate with the WGM 1007 through a second wagering game server at the casino where WGM 1007 resides. The wagering game server 1009 and the second wagering game server can be connected through a communications network. The wagering game server 1009 can be primarily responsible for determining game outcomes and transmitting the game outcomes to the second wagering game server. The second wagering game server can forward the game outcomes to the WGM 1007.

At stage 1003.2 and 1007.2, the WGMs 1003 and 1007 present the content to respective players. For example, in a video poker multiplayer game, the WGMs 1003 and 1007 present each participant's poker hands to the other participants at the end of a round of poker. As another example, in the video poker multiplayer game, the WGMs 1003 presents a bet placed on the WGM 1007 and asks the player at WGM 1003 whether the player wants to raise the bet.

In the example shown in FIG. 10, the mobile phones 1001 and 1005 were connected to the WGMs 1003 and 1007 before the multiplayer wagering game session was established, but embodiments are not so limited. For example, the mobile phone 1005 may connect to the WGM 1007 after receiving the invitation. As another example, the invitation may also be sent to a third mobile phone. The third mobile phone may connect to a third WGM after the wagering game session has been established (i.e., a third player may join the wagering game session after game play has started). The wagering game unit on the mobile phone can determine a WGM that supports the wagering game and direct the third player to the WGM.

Although examples refer to serving content of multiplayer wagering game sessions to WGMs, embodiments are not so limited. For example, a player invited to participate in a multiplayer wagering game session may not be in (or near) a wagering establishment. However, the player may have downloaded a mobile version of the multiplayer wagering game to the player's mobile phone. The wagering game server 1009 can serve content of the multiplayer wagering game session to a wagering game unit on the player's mobile phone. The wagering game unit can allow monetary wagering or casual game play based on the player's location.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments of the invention, which are defined only by the appended claims. Each of the embodiments described herein are contemplated as falling within the inventive subject matter, which is set forth in the following claims.

The invention claimed is:

1. A system comprising:

a wagering game machine including at least one processor, and:

a computer readable storage medium having computer usable code executable on the at least one processor, the computer usable program code including code to:

detect that a mobile device is in proximity to the wagering game machine;

receive, from the mobile device, a request to connect with the wagering game machine;

receive player account information, wherein the player account information corresponds to a player account associated with the mobile device;

determine, based on the player account information, that a player associated with the player account previously played a wagering game on the mobile device;

determine, based on the player account information, that when the player previously played the wagering game on the mobile device, the player unlocked content that can be unlocked only by play of the wagering game on a mobile device;

prepare the wagering game including the unlocked content; and present, on the wagering game machine, the wagering game including the unlocked content.

2. The system of claim 1, wherein the computer usable program code further includes code to:

transmit, to the mobile device, a result of the wagering game.

3. The system of claim 2, further comprising:

the mobile device, wherein the mobile device is configured to:

connect with the wagering game machine;

transmit the player account information from the mobile device; and receive the result for the wagering game.

4. The system of claim 3, wherein the mobile device is further configured to:

display input buttons and game elements in accordance with the wagering game.

5. The system of claim 1 wherein the mobile device is further configured to present a casino floor map indicating that the wagering game machine is configured to present the wagering game.

6. A method comprising:

detecting that a mobile device is in proximity to a wagering game machine;

receiving, from the mobile device, a request to connect to the wagering game machine;

receiving player account information, wherein the player account information corresponds to a player account associated with the mobile device;

determining, based on the player account information, that a player associated with the player account previously played a wagering game on the mobile device;

determining, based on the player account information, that when the player previously played the wagering game on the mobile device, the player unlocked content that can be unlocked only by play of the wagering game on a mobile device;

preparing the wagering game including the unlocked content; and presenting, on the wagering game machine, the wagering game including the unlocked content.

7. The method of claim 6, further comprising:

transmitting, to the mobile device, a result of the wagering game.

8. The method of claim 6, further comprising:

transmitting, to the mobile device, input buttons and game elements in accordance with the wagering game.

* * * * *